May 14, 1946.  C. L. EKSERGIAN  2,400,225

BRAKE COOLING MECHANISM

Filed Nov. 3, 1943

INVENTOR.
Carolus L. Eksergian
BY
ATTORNEY

Patented May 14, 1946

2,400,225

UNITED STATES PATENT OFFICE 2,400,225

BRAKE COOLING MECHANISM

Carolus L. Eksergian, Detroit, Mich., assignor to Budd Wheel Company, Philadelphia, Pa., a corporation of Pennsylvania Application November 3, 1943, Serial No. 508,798

7 Claims. (Cl. 188—264)

This invention relates to brake mechanisms in which a rotary brake member such, for example, as a brake disc is engaged by one or more non-rotary brake members such as shoes which are movable into and out of braking engagement with the disc. More particularly, the invention relates to the cooling of such brakes.

An object is to provide an improved method of cooling disc brakes.

A further object is to provide an improved cooling device for brakes constructed and arranged to cool disc brakes with such efficiency and effectiveness as to render it especially adaptable to heavy service such as that encountered on tanks or other vehicles.

These and other objects which will be apparent are accomplished by the invention hereinafter described and illustrated in the accompanying drawing in which.

Figure 1:
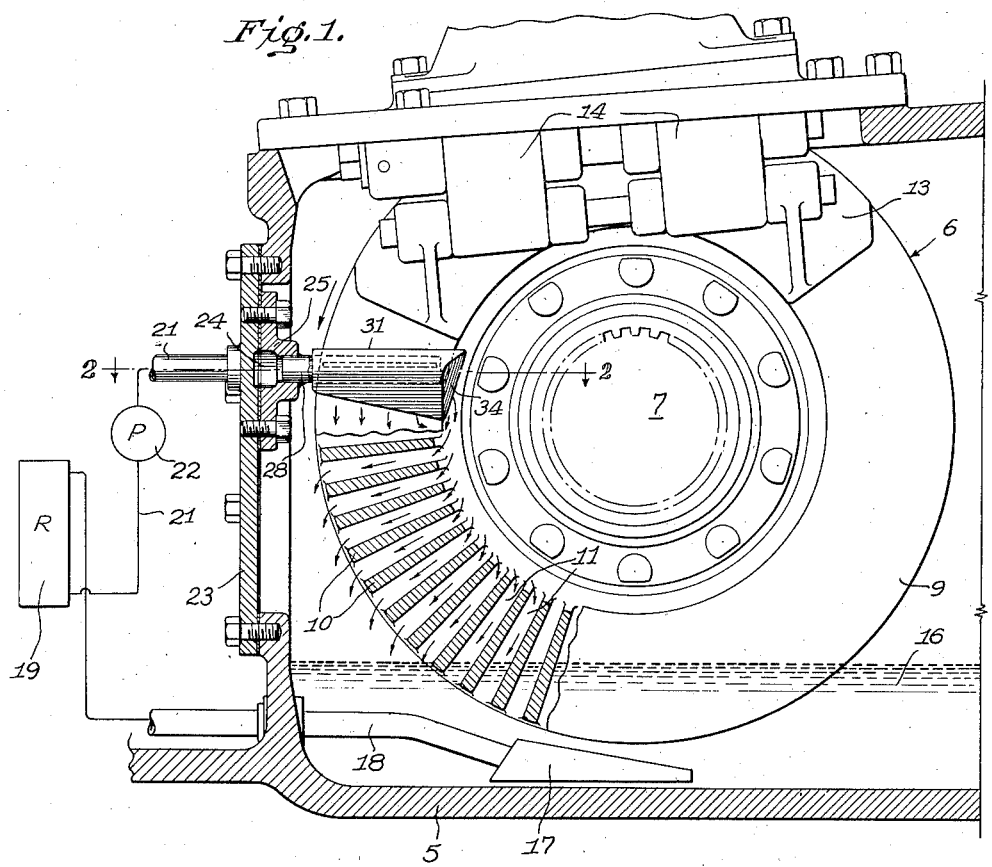
Fig. 1 is a view in elevation, partly in section, of a brake cooling device constructed in accordance with one embodiment of this invention.
Figure 3:
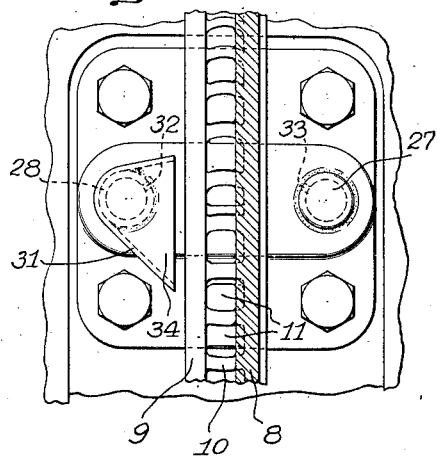
Fig. 3 is a section on the line 3—3 of Fig. 2.

The braking mechanism of the present invention is shown as mounted within a fluid-tight brake housing 5 in which a brake disc 6 is bolted to the driving shaft 7 of the associated vehicle, such for example, as a tank or other vehicle requiring heavy duty braking mechanisms. The brake disc comprises spaced brake surface members 8 and 9 connected together by radially extending vanes 10 forming radial ducts 11 therebetween. The disc is supported by a flange 12 integral with the brake surface member 8 and having an axially extending portion which permits both radial flexibility of the braking faces and allows them to center automatically between the braking shoes applied to the separate faces. A brake shoe 13 is movably supported on yoke members 14 for movement into and out of braking engagement with the face 9, and a similar shoe (not shown), is similarly mounted for movement into and out of braking engagement with the face 8, all as is well known in the art.

The present invention comprises the fluid cooling of the brake mechanism, preferably by applying thereto a cooling liquid such, for example, as oil. For this purpose an oil sump or reservoir 16 is formed in the bottom of the casing 5, the lower portion of the disc being immersed therein. Oil is drawn from this sump through a filter 17 and line 18 to a radiator or cooling device 19 where it is cooled to the desired temperature.

Figure 2:
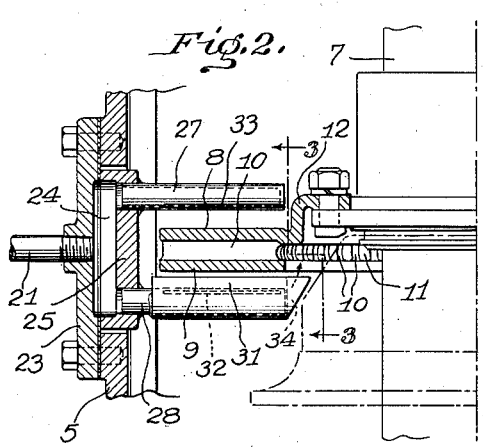
Fig. 2 is a sectional view on the line 2—2 of Fig. 1.

From the radiator the oil is drawn through a line 21 by a pump 22. The oil delivery line 21, extends through a closure plate 23 bolted to the housing 5, and delivers the oil to a distributing chamber 24 formed between the inner face of the closure plate 23 and a distributor plate 25 bolted to the inner face of the closure plate. A pair of fluid nozzle tubes 27 and 28 are mounted in the distributor plate 25 and extending inwardly, one adjacent each braking surface 8 and 9, the nozzle tube 27 extending across the face of the braking surface 8 and nozzle tube 28 extending across the braking surface 9. A fluid directing hood 31 is mounted on and surrounds the outer face of the nozzle tube 28 and extends radially inwardly to a point beyond the inner edge of the braking surface 9, so that some of the fluid issuing from the nozzle tube 28 will be directed by the hood 31 into the radially inner ends of the ducts 11 as the brake disc rotates. For this purpose the hood is provided with an inclined end wall 34 which extends to a position radially inward of the surface 9 so as to direct cooling fluid past the inner edge of such surface into the ducts 11 as indicated by the arrow in Fig. 2 and arrows in Figure 1, the fluid flowing through the ducts in cooling contact with the vanes 10 and the inner walls of the disc. Other oil issuing from the nozzle tube 28 through the nozzle opening 32 is directed forcibly under the pressure built up by the pump P into cooling contact with the entire adjacent face of the braking surface 9. Cooling fluid issuing from the nozzle opening 33 of the nozzle tube 27 is similarly directed into cooling contact with the entire adjacent face of the braking surface 8.

It will be apparent, in the present invention, that the fresh cooling fluid cools the brake disc both externally and internally. The fluid issuing from the nozzle tube 27 flows over the external brake surface 8 and downwardly into the sump 16. Likewise some of the fluid issuing from the nozzle 32 flows over the brake surface 9 and downwardly into the sump 16, while other fluid will flow across the braking surface 9 and after passing across such surface will flow into and through the ducts 11. Simultaneously, additional oil will be directed by the hood 31 directly into the ducts 11, through which it flows in cooling contact with the vanes 10 and the inner faces of the brake disc. This forms, in effect, a combination of a series and parallel flow arrangement. It should be noted that the nozzle tubes 27 and 28 are located to direct the cooling fluid against the brake disc at its point of highest temperature just beyond its exit from engagement with the braking shoes, in order to obtain the greatest differential between the temperature of the disc and the cooling fluid.

It will be apparent that the present invention can be variously modified and adapted within the scope of the appended claims.

What is claimed is:

1. The method of cooling a brake disc having spaced braking surfaces connected by duct forming vanes which comprises flowing a cooling fluid in parallel arrangement over said spaced surfaces in cooling contact therewith, simultaneously directing cooling fluid into and through said ducts in cooling contact with said vanes, and directing a portion of said cooling fluid flowing over one of said surfaces into and through said ducts.

2. The combination in a brake mechanism of a rotary brake disc having spaced braking surfaces connected by duct forming vanes, a brake shoe for engaging said disc, means for delivering a cooling fluid to the face of said disc adjacent said shoe, and means for delivering a cooling fluid to the opposite face of said disc and simultaneously directing said fluid through said ducts in cooling contact with said vanes.

3. The combination in a brake mechanism of a rotary brake disc having spaced braking surfaces connected by duct forming vanes, means for delivering cooling fluid to both of said disc surfaces, and means associated therewith for directing cooling fluid into said ducts between said vanes.

4. The combination in a brake mechanism of a rotary brake disc having spaced braking surfaces connected by duct forming vanes, means for delivering cooling fluid to said disc including spaced nozzles for delivering fluid to each of said braking surfaces, and a hood co-operating with said nozzles for directing a part of the fluid into said ducts.

5. The combination in a brake mechanism of a rotary brake disc having spaced braking surfaces connected by duct forming vanes, means for delivering cooling fluid to said disc including spaced nozzles for delivering fluid to each of said braking surfaces, a hood co-operating with one of said nozzles for directing a part of the fluid into said ducts, a housing for said disc forming a sump, and means for maintaining a fluid level in said housing sufficient to immerse the lower part of said disc.

6. The combination in a brake mechanism of a rotary brake disc having spaced braking surfaces connected by duct forming vanes, means for delivering cooling fluid to said disc including spaced nozzles for directing fluid onto each braking surface, means including a distributing chamber for supplying cooling fluid to said nozzles, a hood co-operating with one of said nozzles for directing fluid into said ducts, a housing forming a fluid containing sump into which a portion of said disc extends, and means for circulating fluid from said sump to said distributing chamber.

7. The combination in a brake mechanism comprising a rotary brake member having an annular braking surface and a non-rotary brake element of materially less circumferential extent than said braking surface for engagement therewith to effect the braking, of a cooling fluid discharge member extending across said braking face for substantially the entire width thereof and means for forcibly discharging a cooling fluid from said member against the braking face across the width thereof and at a location adjacent the end of said element where the braking surface leaves it during the rotation of said rotary member.

CAROLUS L. EKSERGIAN.